US011993834B2

(12) United States Patent
Paranthaman et al.

(10) Patent No.: US 11,993,834 B2
(45) Date of Patent: May 28, 2024

(54) INDIRECT ADDITIVE MANUFACTURING PROCESS FOR FABRICATING BONDED SOFT MAGNETS

(71) Applicants: UT-Battelle, LLC, Oak Ridge, TN (US); Carpenter Technology Corporation, Reading, PA (US)

(72) Inventors: Mariappan Parans Paranthaman, Knoxville, TN (US); Corson L. Cramer, Knoxville, TN (US); Peeyush Nandwana, Knoxville, TN (US); Amelia M. Elliott, Knoxville, TN (US); Chins Chinnasamy, Lancaster, PA (US)

(73) Assignees: UT-Battelle, LLC, Oak Ridge, TN (US); Carpenter Technology Corporation, Reading, PA (US)

( * ) Notice: Subject to any disclaimer, the term of this patent is extended or adjusted under 35 U.S.C. 154(b) by 708 days.

(21) Appl. No.: 16/999,387

(22) Filed: Aug. 21, 2020

(65) Prior Publication Data

US 2021/0057149 A1    Feb. 25, 2021

Related U.S. Application Data

(60) Provisional application No. 62/889,606, filed on Aug. 21, 2019.

(51) Int. Cl.
*C22C 38/02*    (2006.01)
*B22F 1/052*    (2022.01)
(Continued)

(52) U.S. Cl.
CPC .............. *C22C 38/02* (2013.01); *B22F 1/052* (2022.01); *B22F 1/102* (2022.01); *B22F 10/00* (2021.01);
(Continued)

(58) Field of Classification Search
None
See application file for complete search history.

(56) References Cited

U.S. PATENT DOCUMENTS

| 2004/0020569 A1 | 2/2004 | Kanekiyo et al. |
| 2005/0040923 A1 | 2/2005 | Miyoshi et al. |

(Continued)

FOREIGN PATENT DOCUMENTS

| WO | 2019/097449 A1 | 5/2019 | |
| WO | WO-2019097449 A1 * | 5/2019 | ............ C08J 9/0004 |
| WO | 2020/076891 A1 | 4/2020 | |

OTHER PUBLICATIONS

International Search Report and Written Opinion received in International Application No. PCT/US 20/47335 dated Jan. 14, 2021, 11 pages.

(Continued)

*Primary Examiner* — Bernard Rojas
(74) *Attorney, Agent, or Firm* — Scully, Scott, Murphy & Presser, P.C.

(57) ABSTRACT

A bonded soft magnet object comprising bonded soft magnetic particles of an iron-containing alloy having a soft magnet characteristic, wherein the bonded soft magnetic particles have a particle size of at least 200 nm and up to 100 microns. Also described herein is a method for producing the bonded soft magnet by indirect additive manufacturing (IAM), such as by: (i) producing a soft magnet preform by bonding soft magnetic particles with an organic binder, wherein the magnetic particles have an iron-containing alloy composition with a soft magnet characteristic, and wherein the particles of the soft magnet material have a particle size of at least 200 nm and up to 100 microns; (ii) subjecting the preform to an elevated temperature sufficient to remove the organic binder to produce a binder-free preform; and (iii)

(Continued)

sintering the binder-free preform at a further elevated temperature to produce the bonded soft magnet.

24 Claims, 12 Drawing Sheets
(3 of 12 Drawing Sheet(s) Filed in Color)

(51) Int. Cl.
 B22F 1/102  (2022.01)
 B22F 10/00  (2021.01)
 B29C 64/165  (2017.01)
 B33Y 10/00  (2015.01)
 B33Y 70/10  (2020.01)
 H01F 1/147  (2006.01)
 H01F 1/22  (2006.01)
 H01F 1/33  (2006.01)
 H01F 41/02  (2006.01)

(52) U.S. Cl.
 CPC ............ *B29C 64/165* (2017.08); *B33Y 10/00* (2014.12); *B33Y 70/10* (2020.01); *H01F 1/14775* (2013.01); *H01F 1/22* (2013.01); *H01F 1/33* (2013.01); *H01F 41/02* (2013.01); *B22F 2304/056* (2013.01); *B22F 2304/058* (2013.01); *B22F 2304/10* (2013.01)

(56) References Cited

U.S. PATENT DOCUMENTS

| | | | |
|---|---|---|---|
| 2012/0145468 A1* | 6/2012 | Pekala | ................ H01M 10/52 |
| | | | 429/251 |
| 2018/0122570 A1 | 5/2018 | Li et al. | |
| 2018/0169759 A1 | 6/2018 | Nakamura et al. | |
| 2018/0215854 A1 | 8/2018 | Paranthaman et al. | |
| 2018/0229442 A1 | 8/2018 | Ucar et al. | |
| 2019/0013124 A1 | 1/2019 | Maede et al. | |
| 2019/0111618 A1 | 4/2019 | Saito et al. | |
| 2020/0216363 A1 | 7/2020 | Saito et al. | |
| 2020/0347200 A1* | 11/2020 | Dehn | ..................... C08J 9/0004 |

OTHER PUBLICATIONS

Silveyra, J.M., et al., "Soft magnetic materials for a sustainable and electrified world", Science, Oct. 26, 2018, pp. 1-9, vol. 362.

* cited by examiner (1A)

(1B)

(4A)   (4B)

(8A)

(8B)

(8C)

(8D)

INDIRECT ADDITIVE MANUFACTURING PROCESS FOR FABRICATING BONDED SOFT MAGNETS

CROSS REFERENCE TO RELATED APPLICATION

The present application claims benefit of U.S. Provisional Application No. 62/889,606, filed on Aug. 21, 2019, all of the contents of which are incorporated herein by reference.

GOVERNMENT SUPPORT

This invention was made with government support under Prime Contract No. DE-AC05-00OR22725 awarded by the U.S. Department of Energy. The government has certain rights in the invention.

FIELD OF THE INVENTION

The present invention relates generally to soft magnet compositions, particularly iron-containing magnetic alloys. The present invention also relates to methods of additive manufacturing of metals and alloy materials.

BACKGROUND OF THE INVENTION

Soft magnetic silicon steel with 3 wt. % Si is widely used in electrical applications such as transformers, magnetic shielding, motor stators, and generators in applications where high permeability and low losses are required. Increasing Si content improves magnetic and electrical properties, with 6.5 wt. % being optimum. With 6.5 wt. % Si, the magnetostriction becomes zero and low eddy current losses are achieved. However, as the Si content increases (e.g., above 3 wt. % and especially starting at 6 wt. % Si), the steel becomes too brittle to be cold rolled or stamped without cracking, particularly during production of thin sheets. The cracking and other physical defects is generally understood to be attributed to structural ordering of $B_2$ and $DO_3$ types of superstructures. A conventional manufacturing method diffuses Si into thin gauge 3.2% Si steel after chemical deposition. However, the manufacturing cost is high, productivity is limited, and the final product is brittle and difficult to stamp.

The primary factors affecting magnetic properties are strip thickness, silicon concentration, grain size, level of impurities, and crystallographic texture. Grain-oriented, hot rolled, and secondarily recrystallized 3.0 wt. % Si steel with Goss texture {1110} <001> is a typical soft magnetic material, which is widely used as a magnetic core material for transformers and AC power applications. Fe-3 wt. % Si can be hot- and cold-rolled as well as stamped with texture, but these processing methods generally require many heat treatments to achieve adequate magnetic properties and cannot be performed with increased Si content due to brittleness. Thus, there would be a significant advantage in a method that could produce high silicon iron steel materials and a range of other soft magnet materials with any degree of shape complexity without the use of stamping and rolling and without the associated cracks and other defects encountered in objects of such materials according to the conventional art.

SUMMARY OF THE INVENTION

The present disclosure is foremost directed to indirect additive manufacturing (IAM) methods for producing objects constructed of bonded soft magnet particles composed of an iron-containing alloy having a soft magnet characteristic. The soft magnet particles and resulting bonded object may have, for example, an iron-silicon, iron-cobalt, iron-nickel, iron-cobalt-silicon, or iron-nickel-silicon composition. In contrast to the conventional art, the present method advantageously produces objects composed of a soft magnet material of any structural complexity and without the cracks and other defects commonly found in such objects produced according to the conventional art. The present method is particularly advantageous in its capability of producing such complex and defect-free objects even when the object has a high silicon content, such as a silicon content of at least or above 3, 4, 5, or 6 wt. %. The method is further advantageous in that it is relatively straightforward and can produce soft magnet objects of highly complex shapes in a very cost-effective manner.

More specifically, the method employs the following steps: (i) producing a preform constructed of a soft magnet material by an indirect additive manufacturing process in which particles of the soft magnet material become bonded together with an organic binder to construct the preform, wherein the particles of the soft magnet material have an iron-containing alloy composition with a soft magnet characteristic, and wherein the particles of the soft magnet material have a particle size of at least 200 nm and up to 100 microns; (ii) subjecting the preform to an elevated temperature sufficient to remove the organic binder to produce a binder-free preform; and (iii) sintering the binder-free preform at a further elevated temperature to produce the bonded soft magnet.

Generally, the bonded soft magnet particles have a particle size of at least 200 nm and up to 100 microns, or more particularly, a size of at least 200 nm and up to 50 microns, or more particularly, a size of at least 200 nm and up to 10 microns. In some embodiments, the soft magnet particles have a bimodal, trimodal, or higher modal size distribution. In particular embodiments, the magnetic particles and resulting bonded soft magnet have a silicon-containing steel composition, wherein the silicon may be present in an amount of, for example, 3-6.5 wt. %, 4-6.5 wt. %, or 5-6.5 wt. %. The soft magnet particles may, in some embodiments, be admixed with magnetically insulating particles, such as particles having a metal oxide or organic polymer composition.

In particular embodiments, the IAM process is a binder jetting additive manufacturing process. The IAM process may use any of the soft magnetic compositions or particle sizes described above. When a binder jetting process is used, it produces the preform in step (i) by separately feeding the particles of the soft magnet material and the organic binder into a binder jetting manufacturing device, and dispensing selectively positioned droplets of the organic binder from a printhead of the binder jetting manufacturing device into a bed of the particles of the soft magnet material to bind particles of the soft magnet material with the organic binder to form the preform.

As further discussed below, the present disclosure is particularly directed to a scalable additive manufacturing process to construct objects containing high-silicon steel or other alloy (e.g., 6.5 wt. % Si, i.e., Fe-6Si steel) with high magnetic permeability, high electrical resistivity, low coercivity, and low residual induction, which other methods have been significantly hindered in achieving due to manufacturing limitations. Binder jetting or other IAM process can be used to deposit near net shape components that are subsequently sintered via solid-state sintering to achieve near full densification, typically with a bulk, closed density of at least or greater than 90%, 92%, 95%, 96%, 97%, or 98%. Here, it is shown that the use of solid-state sintering mitigates cracking since no rapid solidification occurs, unlike fusion-based additive technologies. As further discussed below, some exemplary bonded Fe-6Si samples demonstrated an ultimate tensile strength of 434 MPa, electrical resistivity of 98 µΩ cm, and saturation magnetization of 1.83 T with low coercivity and high permeability. The results indicate that the indirect additive process described herein can suitably function to replace currently available methods, such as the 0.1 mm thick chemical vapor deposition (CVD) methods of the art.

In particular embodiments, Fe-6.5 wt. % Si soft magnetic material was printed using binder jetting additive manufacturing (BJAM). Parts were cured, followed by debinding, and solid-state sintered to high densities without cracking. The parts had excellent magnetic (both direct current (DC) and AC core loss properties) and mechanical properties. The microstructure was revealed with scanning electron microscopy (SEM) and electron backscatter diffraction (EBSD) showing grain size, orientation, and texture of solid-state sintered samples. This material represents the first demonstration of additively printed Fe-6Si components without cracking. The high physical integrity and outstanding soft magnetic properties of BJAM-processed 6.5% silicon steel parts represents a substantial advancement in the art of soft magnet objects and the power electronics industry.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 1A is a scanning electron microscope (SEM) image of Fe-6Si powder particles. FIG. 1A is a graph plotting Horiba volume distribution and particle percentage data.

FIG. 4A is a SEM image in backscatter mode of a final part sintered to near full density, and FIG. 4B is an SEM image of the same material annealed in $H_2$.

FIG. 5A is an SEM image of the $H_2$ annealed sample at 800° C. for 2 hours. FIGS. 5B-5D are energy-dispersive x-ray spectroscopy (EDS) elemental mapping images of the SEM image, as follows: carbon mapping (FIG. 5B), iron mapping (FIG. 5C), and silicon mapping (FIG. 5D).

FIG. 6A is an inverse pole figure and FIG. 6B is an associated 001 pole figure of the sintered Fe-6Si sample showing lack of texture. FIG. 6C is an inverse pole figure and FIG. 6D is an associated 001 pole figure of the Fe-6Si sample sintered plus annealed in $H_2$ gas, showing lack of texture and higher texture factor compared to the sample that is only sintered.

FIG. 8A is a photograph of an Fe-6Si ring specimen made with BJAM followed by sintering and annealing in $H_2$. FIG. 8B is a photograph of an Fe-6Si ring sample wound with a multistrand Litz wire for the DC and AC magnetic property measurements. FIG. 8C is a plot of the full hysteresis square loop measured at low field. FIG. 8D is a plot of its corresponding maximum permeability.

DETAILED DESCRIPTION OF THE INVENTION

Figure 1A:
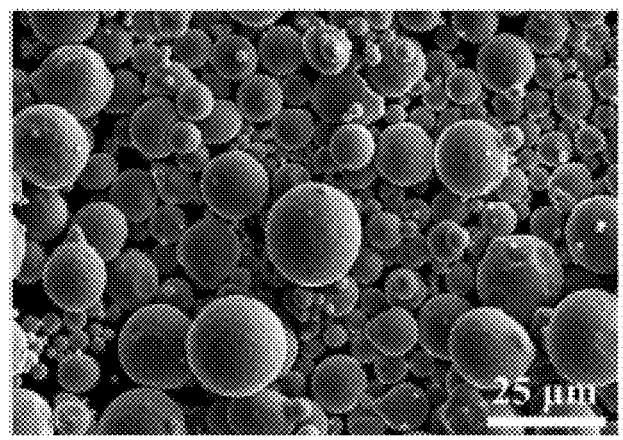
FIGS. 1A-1B.

The indirect additive manufacturing (IAM) process described herein employs particles having a soft magnetic composition as a build material. The soft magnetic particles are thus also referred to herein as "soft magnetic particles". The soft magnetic particles are generally spherical or approximately spherical, but may be any other shape, e.g., platelet-shaped, fiber-shaped, cuboidal, or polygonal. A number of soft magnet compositions are well known in the art, such as described in J. M. Silveyra et al., *Science*, 362 (418), 2018, the contents of which are herein incorporated by reference. Particles of all such compositions are considered herein. The alloy may be a binary, ternary, quaternary, or higher alloy. As well known, unlike a hard or permanent magnet, a soft magnet can be magnetized in the presence of a weak external magnetic field but does not remain permanently magnetized and can be easily demagnetized. Soft magnets typically have coercive force values ($H_c$) of less than A/m, e.g., 0.8-8 A/m, and high values of magnetic permeability, e.g., initial permeability $\mu_a$ of ca. $10^2$-$10^5$ and maximum permeability of $\mu_{max}$ of ca. $10^3$-$10^6$.

The soft magnetic particles are typically composed of an iron-containing alloy that possesses a soft magnet characteristic. The iron-containing alloy contains iron alloyed with one, two, or more other elements, which may be metals or metalloids, provided that the iron-containing alloy possesses a soft magnet property. Some examples of soft magnet compositions include iron-silicon (e.g., silicon-containing steel), iron-cobalt (e.g., permendurs), iron-nickel (e.g., permalloys), iron-aluminum, iron-phosphorus, iron-cobalt-silicon, iron-nickel-silicon, iron-aluminum-silicon, iron-phosphorus-silicon, iron-nickel-cobalt (e.g., perminvars), iron-chromium, iron-nickel-chromium, and iron-silicon-chromium alloy compositions. Steel compositions necessarily also include a few percent of carbon. Generally, the iron-containing alloy contains iron in an amount of at least 20, 30, 40, 50, 60, 70, 80, 90, or 95 wt. % but less than 100 wt. %, or an amount within a range bounded by any two of the foregoing values. The one or more elements alloyed with iron may be included in an amount of at least, above, or no more than, for example, 1, 2, 5, 10, 15, or 20 wt. %. The iron-containing alloy may or may not also include minor amounts (e.g., up to or less than 10, 5, 2, or 1 wt. %) of one or more less common alloying elements, such as molybdenum, manganese, vanadium, boron, copper, or zinc, provided the composition maintains a soft magnet characteristic. The soft magnet alloy may also be amorphous or nanocrystalline. The nanocrystalline composition may be, for example, in the class of Finemet-type compositions, such as $Fe_{73.5}Si_{13.5}B_9Cu_3Nb_1$, such as described in Z. Xue et al., *Metals*, 10, 122, 2020, the contents of which are herein incorporated by reference. Micron-sized particles having a Finemet composition are described in, for example, Z. Guo et al., *Materials and Design*, vol. 192, 108769, July 2020, the contents of which are herein incorporated by reference.

In some embodiments, the alloy composition includes silicon in addition to iron. In particular embodiments, the soft magnetic particles have a silicon-containing steel composition. The silicon may be present in any amount that imparts a soft magnetic property to the steel or other alloy. The silicon may be present in the steel or any other soft magnet alloy composition mentioned above in an amount of precisely, about, or at least, for example, 0.5 wt. %, 1 wt. %, 1.5 wt. %, 2 wt. %, 2.5 wt. %, 3 wt. %, 3.5 wt. %, 4 wt. %, 4.5 wt. %, 5 wt. %, 5.5 wt. %, 6 wt. %, or 6.5 wt. %, or the silicon may be present in an amount within a range bounded by any two of the foregoing values, e.g., 1-6.5 wt. %, 2-6.5 wt. %, 3-6.5 wt. %, 4-6.5 wt. %, 5-6.5 wt. %, or 6-6.5 wt. % of the silicon-containing steel composition. Moreover, any of the silicon-containing alloys described above may be amorphous, crystalline, or polycrystalline.

Notably, the soft magnetic particles and resulting bonded soft magnet exclude hard magnet materials. As well known, hard (permanent) magnets generally possess a large $H_c$, typically greater than 1000 A/m, and high $M_r$, which results in the ability of hard magnets to retain a large magnetization after being magnetized. Some examples of hard magnet compositions excluded in the present disclosure include, for example, alnico, alloys containing rare earth elements (any of the lanthanide elements having atomic numbers 57-71, along with scandium and yttrium), magnetite, and lodestone. Some particularly well-known hard magnets excluded herein include samarium-based permanent magnets, such as samarium-cobalt (Sm—Co alloy), e.g., $SmCo_5$ and $Sm_2Co_{17}$, and neodymium-based permanent magnets, such as neodymium-iron-boron (Nd—Fe—B), typically having the formula $Nd_2Fe_{14}B$. Other examples of hard magnetic materials excluded herein include MnBi, $Fe_{16}N_2$, and ferrite-type compositions, such as those having a Ba—Fe—O or Sr—Fe—O composition.

The soft magnetic particles typically have a size of at least 200 nm and no more than 100 microns (i.e., in the range of 0.2-100 microns). In different embodiments, the soft magnetic particles have a size of, for example, 0.2, 0.5, 1, 2, 5, 10, 15, 20, 25, 30, 35, 40, 45, 50, 60, 65, 70, 75, 80, 85, 90, 95, or 100 microns, or a size within a range bounded by any two of the foregoing values (e.g., 0.2-50 microns, 1-100 microns, 1-50 microns, 1-10 microns, 2-100 microns, 2-50 microns, 2-10 microns, 5-100 microns, 5-50 microns, 5-20 microns, 10-100 microns, 10-50 microns, 20-70 microns, 30-60 microns, or 40-50 microns). In some embodiments, the soft magnetic particles have at least a bimodal particle size distribution. The phrase "at least a bimodal particle size distribution" indicates that the particle size distribution may be strictly bimodal or may have a higher modality, such as trimodal. As well known, a bimodal size distribution is characterized by the presence, in a particle size distribution plot, of two distinct size distributions, each distribution characterized by a peak. A trimodal size distribution has three distinct size distributions, each distribution characterized by a peak. The two or more distributions in the multimodal size distribution may be overlapping or non-overlapping.

Generally, the term "size," as used herein, refers to a distribution of particle sizes over a specified range of sizes, such as any of the possible size ranges provided above. In some embodiments, particles having a size outside of a specified range are excluded. For example, for a size range of 0.2-100 microns, particles having a size over 100 microns may be excluded (i.e., 100 wt. % or 100 vol % of the particles are within the indicated size range). In other embodiments, particles having a size above or below any of the exemplary particle sizes or ranges provided earlier above may be excluded, e.g., a particle size below 200 nm, 500 nm, or 1 micron may be excluded and/or a particle size above 1, 5, 10, 20, 50, or 100 microns may be excluded. In other embodiments, at least or more than 75, 80, 85, 90, 95, 98, or 99 wt. % (or vol %) of the particles are within a specified size range, which may be any of the exemplary size ranges provided above, which thus permits some amount of the particles (i.e., up to or less than 25, 20, 15, 10, 5, 2, or 1 wt. % or vol %, respectively) to reside outside of the indicated size range. The particle size may be further or alternatively expressed in terms of a size distribution parameter D, such as $D_{50}$, $D_{10}$, and $D_{90}$, as well known in the art. The $D_{50}$, $D_{10}$, or $D_{90}$ for the particles may be selected from, for example, any of the specific exemplary particle size values provided above. In some embodiments, the soft magnetic particles independently have a $D_{50}$ of any of the exemplary particle sizes provided above (or range therein), respectively.

The IAM process described herein can produce a bulk (macroscopic) object (i.e., "bonded soft magnet object" or "object") from any of the soft magnetic particle compositions described above. The object can have any degree of complexity or intricacy, such as edges or vertices, e.g., sharp (e.g., 90° or more acute) corners, bends, or folds. For purposes of the invention, the IAM process does not include direct additive manufacturing processes, which typically rely on heat for welding (i.e., fusing or sintering) the particles together during the manufacturing (bonding) process. Some examples of direct additive manufacturing processes, which are excluded from the present process, include direct laser (e.g., selective laser sintering, selective laser melting, or electron beam melting) or melting processes well known in the art.

In some embodiments, the object is constructed from a mixture of the soft magnetic particles and electrically insulating (electrically non-conductive) particles. The mixture of particles is typically a homogeneous mixture. The resulting bonded object is thus constructed of bonded soft magnetic particles in admixture with (and bonded with) electrically insulating particles. The presence of the electrically insulating particles can provide better propagation of resistive heat in the bonded object, which can be advantageous in applications where a large amount of such heat occurs during operation, such as in a motor. The insulating component may also boost the resistivity (p) to, e.g., $10^{-3}$ to $10^{-1}$ microohm·m, thereby reducing eddy current losses. The electrically insulating particles can have any of the compositions well known in the art to be electrically insulating.

In one set of embodiments, the electrically insulating particles have an inorganic composition, such as, for example, a metal oxide, metal sulfide, metal carbide, metal nitride, or metal boride composition. Some examples of metal oxide compositions include aluminum oxide (e.g., $Al_2O_3$), silicon oxide (e.g., glass or sand), gallium oxide, indium oxide, germanium oxide, tin oxide, indium tin oxide, yttrium oxide, titanium oxide, zirconium oxide, hafnium oxide, vanadium oxide, niobium oxide, tantalum oxide, chromium oxide, and magnesium oxide. Some examples of metal sulfide compositions include sulfide analogues of the foregoing oxides. Some examples of non-conductive metal carbides include silicon carbide and aluminum carbide. Some examples of metal nitrides include boron nitride, silicon nitride, silicon oxynitride, silicon carbide nitride, aluminum nitride, tantalum nitride, and zirconium nitride.

Some examples of metal borides include aluminum boride, titanium boride, cobalt boride, tantalum boride, and magnesium boride.

In another set of embodiments, the electrically insulating particles have an insulating organic, inorganic, or hybrid polymer composition. Some examples of such polymer compositions include polysiloxanes, polysilazanes, polyphosphazenes, polyesters, polyolefins (e.g., polyethylene, polypropylene, or polystyrene), polyurethanes, polycarbonates, polyamides, polyvinyl addition polymers, phenol-formaldehyde, urea-formaldehyde, polyoxymethylene (polyacetal), polyethyleneimine, polybenzimidazole (PBI), polybenzoxazole, polyurea, polyether ether ketone (PEEK), polyphenylene oxide, polyphenylene sulfide, ABS, and polyaryletherketone (PAEK), as well as blends and copolymers thereof.

In a first step of the IAM method, i.e., "step (i)," particles having a soft magnet composition, as described above, are bonded together with an organic binder to construct a preform. The soft magnetic particles used in the IAM method can have any of the compositions, particle sizes or ranges, or particle size distributions described above. The IAM process can be any of the indirect manufacturing processes known in the art capable of using ceramic or metal powder to construct a preform. The shape of the object being built can include any level of detail made possible by IAM processes of the art. The IAM process operates by bonding particles to each other with an organic binder to construct a preform that is subsequently debinded and optionally subsequently sintered. The IAM process may be, for example, a binder jetting (BJAM), lithography-based ceramic manufacturing (i.e., ceramic photolithography), or direct-ink-writing (DIW) process (also known as robocasting), all of which are well known in the art (e.g., U.S. Pat. No. 6,036,777 for binder jetting; S. Nohut et al., "Ceramic Additive Manufacturing via Lithography," *Ceramic Industry*, pp. 22-26, October 2018 for lithography-based ceramic manufacturing; and J. A. Lewis, *Adv. Funct. Mater.*, 16, 2193-2204, 2006 for DIW process). The IAM process may also be a fused deposition modeling (FDM) or 3D printing process, all of which are well known in the art. In the FDM or 3D printing process, a nozzle of the additive manufacturing device is moved in precise horizontal and vertical positions as beads of the composite (e.g., soft magnetic particles admixed in a binder matrix) are deposited. The beads of composite are sequentially deposited to build a magnetic object, layer by layer. The nozzle movements and flow rate of the composite are generally controlled by computer software, typically a computer-aided manufacturing (CAM) software package. The FDM or 3D printer builds an object (article) based on instructions provided by a computer program that includes precise specifications of the object to be constructed.

The IAM process may also be a big area additive manufacturing (BAAM) process.

As well known in the art, the BAAM process employs an unbounded open-air build space in which at least one, and typically, a multiplicity, of deposition heads controlled by one or a multiplicity of multi-axis robotic arms operate in concert to construct an object. In the BAAM process, the feed material is processed within and ultimately deposited from the deposition head layer-by-layer as an extrudate, which cools over time to produce the bonded soft magnet. The BAAM process is described in detail in, for example, C. Holshouser et al., *Advanced Materials & Processes*, 15-17, March 2013, and M. R. Talgani et al., *SAMPE Journal*, 51(4), 27-36, July/August 2015, the contents of which are herein incorporated by reference in their entirety.

In particular embodiments, the IAM process is a binder jetting process, as well known in the art. The binder jetting process is described in detail in, for example, U.S. Pat. Nos. 6,036,777, 10,040,216, and X. Lv et al., *Ceramics International*, 45(10), 12609-12624, July 2019, the contents of which are herein incorporated by reference in their entirety. In the binder jetting process, soft magnet powder, as described above, is fed into a binder jetting manufacturing device (BJMD) as a build material. The powder is typically dispensed as a layer (bed) of build material on a vertically movable platform within the BJMD. An organic binder, either alone or admixed with a solvent, is separately fed into the BJMD and routed to a printhead positioned over the bed of powder. The organic binder may be any of the binders well known in the art of binder jetting, such as a polymer (e.g., adhesive substance) or curable monomer. In some embodiments, the organic binder is or includes a polyol-based (e.g., glycol-based binder) composition, phenolic composition (e.g., phenolic resin), or furfuryl-based composition (e.g., furfuryl alcohol-based binder). The organic binder may or may not also include crosslinkable functional groups. Polymers containing crosslinkable groups are well known in the art, such as generally described in U.S. Pat. No. 7,287,587, the contents of which are herein incorporated by reference. The crosslinkable polymer may be, for example, any of the numerous epoxide-containing crosslinkable polymers known in the art; or, for example, any of the formaldehyde-containing polymers, such as a phenol-formaldehyde, formaldehyde-amine, or phenol-formaldehyde-amine polymer, such as described in A. Chernykh et al., *Polymer*, vol. 47, no. 22, pp. 7664-7669, 2006, the contents of which are herein incorporated by reference; or, for example, any of the crosslinkable polymers based on benzocyclobutene, such as described in K. A. Walker et al., *Polymer*, vol. 35, no. 23, pp. 5012-5017; or, for example, any of the vinyl ester resins and unsaturated polyester resins known in the art, such as described in S. Jaswal et al., *Rev. Chem. Eng.*, 30(6), pp. 567-581, 2014.

Based on instructions provided by a computer program, as generally provided by a computer-aided manufacturing (CAM) software package, the printhead is directed to dispense selectively positioned droplets of the binder onto the powder bed of soft magnetic particles to form a first layer of the soft magnet object being built. The printhead can be an inkjet printhead, as well known in the art. Thus, the droplets of the binder can be precisely positioned in various locations on the powder bed to form a first layer of the article being built. As well known in the art of binder jetting, once a first layer of the article is built, the platform holding the powder bed is lowered by an amount equivalent to a layer thickness. A subsequent layer of the object is built by selectively depositing a second set of selectively positioned droplets of the binder. The platform holding the powder bed is then lowered again by another layer thickness, and the process is continued until a preform having the shape of the object to be built is produced. The preform produced by the IAM process generally contains some porosity and is constructed of particles of the soft magnet particles described above bonded together with the organic binder. The above described binder jetting process is meant to be exemplary, and numerous modifications of the above described process can be made. Generally, the preform, produced as above, possesses at least or above 80, 85, 90, or 95% theoretical density (TD).

After producing the preform constructed of soft magnetic particles bonded with organic binder, the preform is subjected to a debinding step, i.e., "step (ii)," in which the preform is subjected to an elevated temperature (i.e., debinding temperature) sufficient to remove the organic binder to produce a binder-free preform. The debinding temperature is dependent on the composition of the binder, since different binders have different vaporization and decomposition temperatures. Depending on the binder, the debinding temperature may be at least or up to, for example, 100° C., 200° C., 300° C., 400° C., 500° C., 600° C., 700° C., 800° C., or 900° C., or a temperature within a range bounded by any two of the foregoing values (e.g., 100-900° C., 100-800° C., 100-700° C., 200-900° C., 200-800° C., or 200-700° C.).

Although the preform may be subjected to a sudden change in temperature from completion of step (i) to start of step (ii), the preform is more typically heated gradually to reach a debinding temperature from a lower temperature. The preform may also be gradually increased from one temperature to another within the debinding temperature range. The gradual increase in temperature is defined by a rate of temperature increase (i.e., increasing temperature gradient). The rate of temperature increase may be at, up to, or less than, for example, 1° C./min, 2° C./min, 5° C./min, 10° C./min, 15° C./min, or 20° C./min, or a rate of temperature increase within a range bounded by any two of the foregoing values (e.g., 1-20° C./min, 2-20° C./min, or 5-15° C./min). For example, the preform may be at a temperature of about 25° C. (room temperature) at the end of step (i) and then raised in temperature (e.g., by placing in an oven) to a temperature of 500° C., 600° C., or 650° C. in step (ii), and the preform may be maintained at 500° C., 600° C., or 650° C. for a suitable time period (e.g., 0.5, 1, 1.5, or 2 hours) and/or elevated to a second debinding temperature (e.g., 650, 700, 750, or 800° C.) and maintained at the second temperature for a suitable time period, wherein the temperature raisings or elevations may independently be achieved using any suitable temperature gradient. A gradual increase in temperature is preferred, since a sudden increase in temperature will likely introduce physical defects (e.g., cracking) into the preform. Thus, in a preferred embodiment, the preform transitions gradually from room temperature (i.e., at the end of step (i) when the preform is constructed) to a debinding temperature within the above debinding temperature range, and the preform may be maintained at the debinding temperature for a specified period of time or may be gradually elevated in temperature to another temperature within the debinding temperature range. For example, the preform may be at a temperature of about 25° C. at the end of step (i) and then placed in an oven not yet preheated (i.e., at room temperature) or pre-heated to a mild temperature of 50° C. or a curing temperature, and the temperature of the oven gradually increased to a debinding temperature, wherein one or more debinding temperatures may be maintained for a suitable amount of time.

In some embodiments, the volatilization of the organic binder in step (ii) results in substantially or absolutely no residual carbon formed as a result of decomposition of the organic binder. The substantial absence of a carbon residue may be achieved by selection of a lower carbon-containing (higher oxygen-containing) organic binder and/or the conditions employed in step (ii). For example, in some embodiments, step (ii) is conducted in an atmosphere containing hydrogen ($H_2$) gas, typically as 1-5 vol % hydrogen admixed with argon. In some embodiments, the volatilization of the organic binder in step (ii) results in residual carbon (e.g., 0.001-0.05 wt. % by weight of the subsequent infiltrated silicon) formed as a result of decomposition of the organic binder. Where residual carbon is desired, an inert atmosphere (e.g., argon) may be used, in the substantial or complete absence of hydrogen gas. If desired, the formation of residual carbon may be further promoted by use of a high-carbon type of binder, such as any of the phenolic-containing polymers described earlier above. Conversely, if desired, formation of residual carbon can be largely avoided by use of a low-carbon type of binder.

In some embodiments, after producing the preform by the binder jetting or other IAM process employing an organic binder in step (i), and before the debinding step (ii), the preform may be subjected to a curing step to fully vaporize solvents and/or to at least partially vaporize (decompose) or cure the organic binder. The curing step subjects the preform to one or more conditions that can induce crosslinking (if applicable) or partial vaporization of the organic binder and/or vaporization of a solvent. The curing condition may entail exposure of the preform to, for example, heat, high-energy electromagnetic radiation (e.g., ultraviolet), or chemically reactive substance incorporated into the preform, which works over time and that may be further activated by exposure to heat or electromagnetic radiation (e.g., ultraviolet or x-ray). Generally, when heat is employed, the curing temperature is below the melting point of the organic binder or metal powder. In some embodiments, and depending on the chemical composition of the organic binder and powder, the curing temperature is at least 30° C., 40° C., 50° C., or 60° C. and up to 80° C., 100° C., 120° C., 150° C., 180° C., 200° C., 220° C., or 250° C., or within a range between any two of the foregoing temperatures. In the case where the organic binder is admixed with a solvent, a separate drying step (e.g., 100° C. maintained for at least 1 hour) may be employed before the curing step or as part of the curing step to remove the solvent.

In some embodiments, after the debinding step (ii), the resulting binder-free preform is subjected to a sintering step, which may herein be referred to as step (iii). The sintered preform is herein considered a bonded soft magnet object, although, as further discussed below, the sintered preform (bonded soft magnet object) may undergo further treatment to further improve its magnetic or physical properties. The sintering process is typically employed to densify and strengthen the preform. That is, whereas the initially formed ("green") preform from step (i) or after curing has a packing density of about 30-50%, the sintering step typically results in a packing density of at least or above 60%, 70%, 80%, or 90%.

The sintering is typically achieved by subjecting the preform to a suitably elevated temperature, but below the melting point of the powder, at which the particles in the powder become fused. Preferably, for purposes of the invention, the sintering process results in sufficient fusing to result in a robust (i.e., infrangible) object constructed of the soft magnetic powder. The sintering process typically employs a temperature within a range of 1000-1500° C. to produce a sintered soft magnet preform. In different embodiments, the sintering temperature is, for example, 1000° C., 1050° C., 1100° C., 1150° C., 1200° C., 1250° C., 1300° C., 1350° C., 1400° C., 1450° C., or 1500° C., or a temperature within a range bounded by any two of the foregoing values (e.g., 1150-1350° C. or 1150-1250° C.). The preform may be subjected to any of the above exemplary temperatures for a suitable time period (e.g., 0.5, 1, 1.5, 2, 2.5, or 3 hours) to result in sufficient sintering. The sintering may be performed in air or under an inert atmosphere. Moreover, the sintering may be performed under standard pressure or a reduced pressure, such as a pressure at, no more than, or less than, for example, $10^{-3}$, $10^{-4}$, $10^{-5}$, $10^{-6}$, or $10^{-7}$ Torr. The sintering process may be conducted in an inert atmosphere (e.g., completely argon or nitrogen) or a reactive atmosphere (e.g., presence of hydrogen).

In some embodiments, the binder-free preform, as produced in step (ii), is first cooled to a lower temperature, such as room temperature, before being subjected to a sintering temperature. In a first embodiment, the binder-free preform transitions abruptly from room temperature or a debinding temperature to a sintering temperature, and the preform may be maintained at the sintering temperature for a specified period of time (e.g., 0.5, 1, 1.5, or 2 hours) or may be gradually elevated in temperature to a second higher sintering temperature within the sintering temperature range (and may or may not be maintained at the second temperature). For example, the binder-free preform may be at a temperature of about 25° C. (room temperature) after step (ii) and then placed in an oven pre-heated to a sintering temperature, and the binder-free preform may be maintained at the sintering temperature for a suitable time period and/or elevated to a second sintering temperature and maintained at the second temperature for a suitable time period. Although the foregoing embodiment is possible, it is less desirable than a gradual increase in temperature, since a sudden increase in temperature may introduce physical defects (e.g., cracking) into the preform. Thus, in a second embodiment, the binder-free preform transitions gradually from room temperature or a debinding temperature of step (ii) to a sintering temperature within the above sintering temperature range, and the binder-free preform may be maintained at the sintering temperature for a specified period of time or may be gradually elevated in temperature to another sintering temperature within the sintering temperature range. For example, in some embodiments, the preform may be at a temperature of about 25° C. after step (ii) and then placed in an oven not yet preheated (i.e., at room temperature) or pre-heated to a mild temperature of 50° C.-250° C. (which may function as a curing step), and the temperature of the oven gradually increased to a debinding temperature of 500-900° C. or higher (wherein one or more debinding temperatures may be maintained for a suitable amount of time), followed by further gradual increasing of the temperature to a sintering temperature (wherein one or more sintering temperatures may be maintained for a suitable amount of time, as discussed above).

In some embodiments, the sintered magnetic object is subjected to an annealing (heat treatment) process to, for example, improve the packing density. The annealing step can further densify the sintered magnetic object to a packing density of at least or greater than, for example, 75%, 80%, 85%, 90%, 95%, 96%, 97%, 98%, or 99%. The annealing process typically employs a temperature higher than used in the sintering step, e.g., a temperature of at least or above, for example, 1550° C., 1600° C., 1650° C., 1700° C., 1750° C., 1800° C., 1850° C., 1900° C., 1950° C., 2000° C., 2050° C., 2100° C., 2150° C., or 2200° C., or a temperature within a range bounded by any two of the foregoing values (e.g., 1800-2200° C.). The sintered bonded soft magnet may be subjected to any of the above exemplary temperatures for a suitable time period (e.g., 0.5, 1, 1.5, 2, 2.5, or 3 hours) to result in sufficient annealing. The annealing is typically performed under an inert atmosphere and under standard pressure or a reduced pressure, such as a pressure at, no more than, or less than, for example, $10^{-3}$, $10^{-4}$, $10^{-5}$, $10^{-6}$, or $10^{-7}$ Torr. The annealing process may be conducted in an inert atmosphere (e.g., completely argon or nitrogen) or a reactive atmosphere (e.g., presence of hydrogen). Notably, depending on the temperature used in the annealing process, the annealed object may no longer be characterized by distinct particles bonded with each other, but by amorphous grains having an average size corresponding to the particles used in the manufacture of the object.

In some embodiments, the IAM process builds a composite object from a powder containing a mixture of the soft magnetic particles and electrically insulating (electrically non-conductive) particles, as described above. The mixture of particles is typically a homogeneous mixture. In other embodiments, the IAM process builds a composite object containing at least one layer of the bonded soft magnetic particles bonded with at least one layer of electrically insulating particles, i.e., wherein the soft magnetic particles are not mixed with the electrically insulating particles. In different embodiments, the IAM process builds an object containing at least one, two, three, four, or five layers of the bonded soft magnetic particles bonded with at least one, two, three, four, or five layers of the electrically insulating particles, wherein the layers may be in an alternating arrangement or other patterned arrangement. In some embodiments, the layers of bonded soft magnetic particles alternate with layers of the electrically insulating particles. The individual layers may independently have thicknesses corresponding to any of the particle sizes provided earlier above, e.g., anywhere in the range of 0.2-100 microns. However, as the IAM process can build by successive deposition of particles for a layer, a layer may have a thickness well above 100 microns, e.g., at least or above 200, 300, 400, or 500 microns, or even in the millimeter range (e.g., at least or above 1, 2, or 5 millimeters).

The composition and shape of the bonded soft magnet object (which may or may not be a composite object) can be appropriately selected to make the object useful for any of a number of desired applications. The soft magnet object may be used, for example, to manage the bidirectional flow of power between sources of electrical power, e.g., power plants, power lines, solar arrays, or wind turbines. The soft magnet object may also be used in an inductor, transformer, or other electrical device, or more particularly, transformer core (e.g., microphone, output, intermediary, or peak transformer), magnetic screen, computer memory component, core of a magnetic recording head, magnetic antenna, or wave guide.

Examples have been set forth below for the purpose of illustration and to describe certain specific embodiments of the invention. However, the scope of this invention is not to be in any way limited by the examples set forth herein.

EXAMPLES

Overview

In the present work, Fe with 6.5 wt. % Si (i.e., "Fe-6.5 Si") soft magnetic material was printed using a BJAM process. Parts were cured, followed by debinding, and solid-state sintered to high densities without cracking. The parts had excellent magnetic (both direct current (DC) and alternating current (AC) core loss properties) and mechanical properties. The microstructure was revealed with scanning electron microscopy (SEM) and electron backscatter diffraction (EBSD) showing grain size, orientation, and texture of solid-state sintered samples. In contrast to the conventional art, the presently described bonded material successively achieved additively printed Fe-6 Si or Fe-6.5 Si components without cracking. The BJAM-processed 6.5% silicon steel parts with outstanding soft magnetic properties (high magnetic induction, high permeability, and low coercivity), along with defect-free nature, represent a significant advance in the power electronics industry.

Building a Soft Magnet Object Using Fe-6Si Powder

Figure 1B:
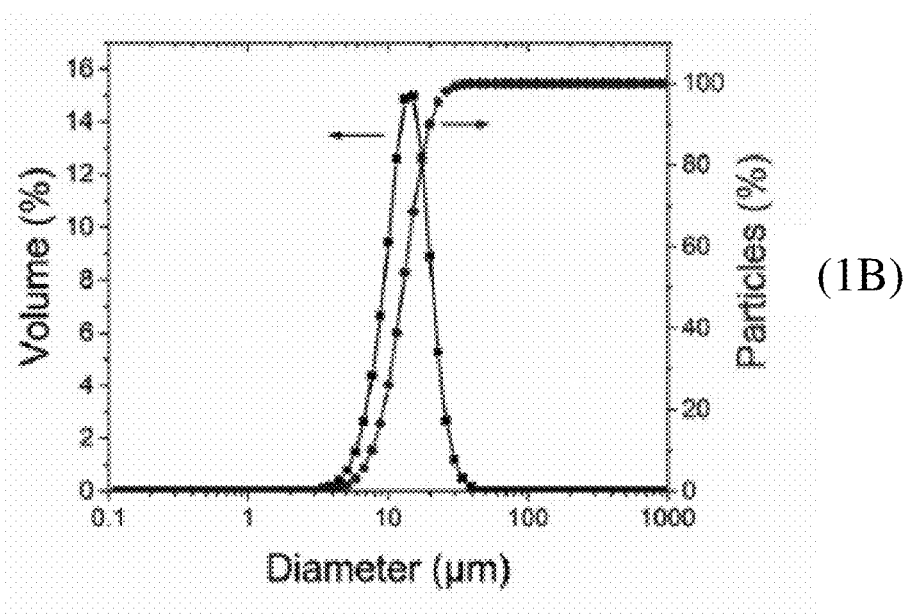

The Fe-6Si powder used herein had $d_{90}<22$ μm). A SEM image of the particles is shown in FIG. 1A. The particle size distribution is shown in FIG. 1B. Particle analysis employed a particle analyzer using laser scattering of dry powders to provide volume distribution and particle percentage. As shown in FIGS. 1A and 1B, the powder is spherical and has a size distribution between 6-30 μm with a $d_{50}$ of 13.2 μm. This powder was selected for the BJAM process because the spherical powders are easier to spread on the powder bed, and furthermore, can have higher packing than irregular shaped powder particles.

Figure 2:
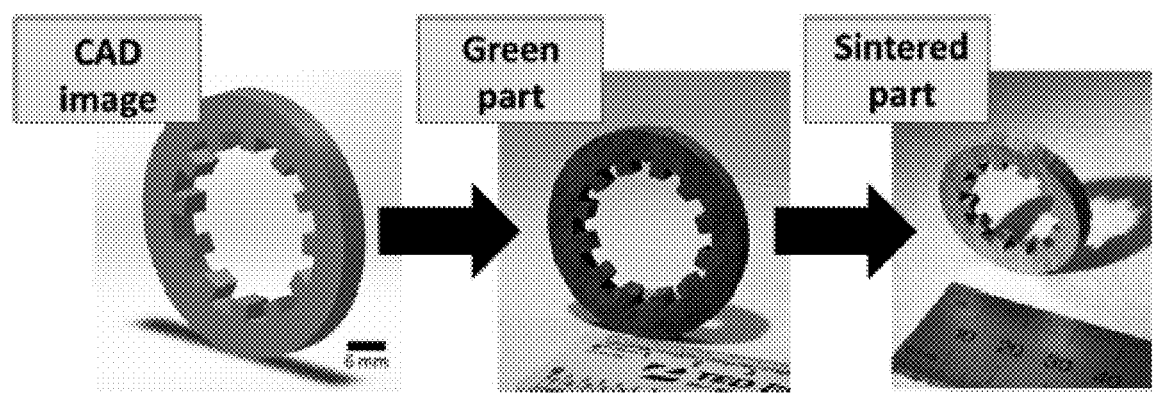
FIG. 2 is a schematic of processing steps where the CAD design is realized (left panel), parts are printed, green parts are cured and powder free (center panel), and the green part is sintered to a fully dense Fe-6Si part (right panel).

FIG. 2 shows a schematic diagram for fabricating the specimens made in the current work. The first step (left panel) usually involves making a computer aided design (CAD) model of the component to be printed. The CAD model was oversized to account for the shrinkage associated with densification during solid state sintering. Using the CAD file, the green part was printed on the machine (middle panel) and was subjected to debinding and sintering to generate the final sintered part (right panel). Before printing, the alloy powders were dried in an oven at 100° C. in air for an hour and immediately transferred to the printer. The printing of the Fe-6Si was done using an ExOne® Lab BJAM machine. The feed powder to layer ratio was 2.5:1, meaning that more powder is deposited and then smoothed by the roller to get good compaction. Each printed layer was 80 μm thick, the powder spread velocity was 1 mm/s, and binder saturation (amount of binder relative to powder) and powder packing (density of the powder in the bed) were 120% and 45%, respectively. The binder used was a proprietary commercial binder (ProMetal R-1 from ExOne). After printing, the parts were cured at 200° C. for 1 h in air. After curing, the parts were debound by ramping up at 5° C./min to 630° C., held at 630° C. for 1 hour, ramped to 900° C. at 10° C./min, and held at 900° C. for 1 hour while flowing Ar gas continuously at 300 cubic centimeters per minute. After debinding, the parts were solid-state sintered in a W-based vacuum furnace at 1300° C. for 2 hours under $10^{-5}$ Torr vacuum. Most of the characterizations were done on sintered samples. Samples were annealed at two different temperatures, 750° C. for 2 hours and 800° C. for 2 hours, in flowing pure $H_2$ gas after sintering to investigate texturing and grain growth and to determine the effect on core loss properties.

The sintered specimen microstructures were analyzed with SEM using a Hitachi® S4800 microscope in backscatter electron imaging mode. Geometric, Archimedes, and areal densities were measured when appropriate. Geometric and Archimedes densities were measured by measuring the part dimensions, dry mass, and submerged mass. Areal density was measured using ImageJ on SEM cross-sections (T. Ferreira et al., ImageJ User Guide IJ 1.46r" *ImageJ*, 2012). Shrinkage was measured with dimensions before and after sintering. Optical images were taken using a Leica® DM5000 M LED system. Phase composition was determined by X-ray diffraction (XRD) with continuous θ-2θ scans performed on the PANalytical Empyrean diffractometer from nominally 5-90° 2θ with Cu Kα radiation and matched with HighScore Plus software database. EBSD was carried out on a JEOL® 6500 Microscope equipped with an EDAX™ Hikari detector. Data was collected using EDAX™ OIM data collection software and analyzed using EDAX™ OIM Data Analysis software package. Carbon content was analyzed using a combustion process based on the ASTM D513 (B) modified standard, which determines total or dissolved carbon present as carbon dioxide, carbonic acid, bicarbonate ion, and carbonate ion in water within the specimen (ASTM d513-16 standard test methods for total and dissolved carbon dioxide in water, in: ASTM Volume 11.01 Water (I), ASTM International, West Conshohocken, Pa., 2016). Magnetic properties of printed and sintered samples were measured using a Quantum Design magnetic property measurement system. In addition, the DC and AC core loss properties of both sintered and annealed ring sample geometries were measured based on the ASTM standards A773/A773M and A927/A927M. Mechanical properties were measured with sheet specimen-three tensile specimens using ASTM standard E8/E8M-16a. Vickers hardness measurements were performed under a 0.3 kgf load.

Results and Discussion

BJAM successfully yielded Fe-6Si green parts with 58% bulk density as presented in Table 1 and with net shaping, as shown in FIG. 2. Sintering of the green parts resulted in highly dense parts with diametral linear shrinkage near 20%, as shown in Table 1 below. Final parts were fully sintered and had no cracks, as shown in FIG. 2. The same process was used for fabricating test specimens for magnetic and mechanical properties but in their respective geometries. The carbon content of the powder was measured and is reported in Table 1 and there was a small increase (0.25 wt. %) in carbon content after sintering, which results from the binder used for printing.

TABLE 1

Properties of printed and sintered Fe—6Si including density, shrinkage, grain size, hardness, and carbon content.

| Property | Result |
|---|---|
| Theoretical Density of Fe—6.5%Si (g/cm³) | 7.48 |
| Green Density (g/cm³, % TD) | 4.2, 58 (geometric only) |
| Final Density (g/cm³, % TD) | 7.31, 99 (Archimedes only) |
| Shrinkage (linear %) | 20 |
| Grain size from EBSD after sintering (μm) | 56.3 ± 32.8 |
| Grain size after sintering and annealing in $H_2$ (μm) | 61.1 ± 35.9 |
| Hardness (GPa) | 3.92 ± 0.12 |
| Carbon content of powder (wt. %) | 0.010 |
| Carbon content after sintering (wt. %) | 0.247 |

Figure 3:
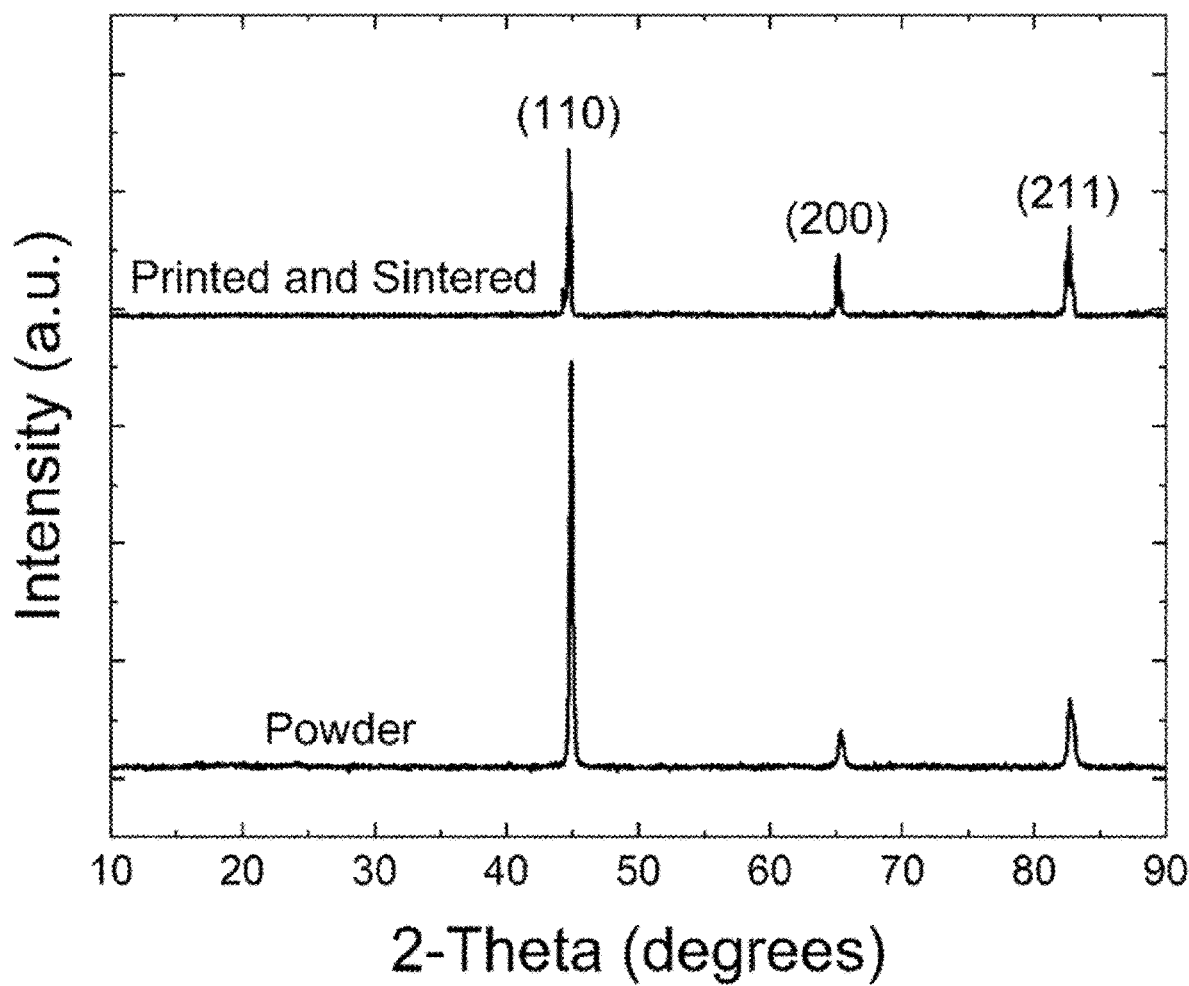
FIG. 3 shows XRD patterns of soft magnetic powder and a final part produced according to the process outlined in FIG. 2.

FIG. 3 shows the XRD patterns of the as-received powder and printed parts that went through the processing steps outlined in FIG. 2. The cubic phase was observed in both starting powders and the final sintered part. No major change in the peak intensity for the printed samples coincides with no major changes observed during processing. The peaks of printed and sintered samples are sharper compared to the powder, which is attributed to an increase in grain size or strain effect. In this case, residual stresses were most likely relieved during post-annealing. Even though the XRD patterns do not show the presence of B2 and $DO_3$ phases, these phases may be present below the detection limit of X-ray diffraction equipment.

Figures 4A, 4B:
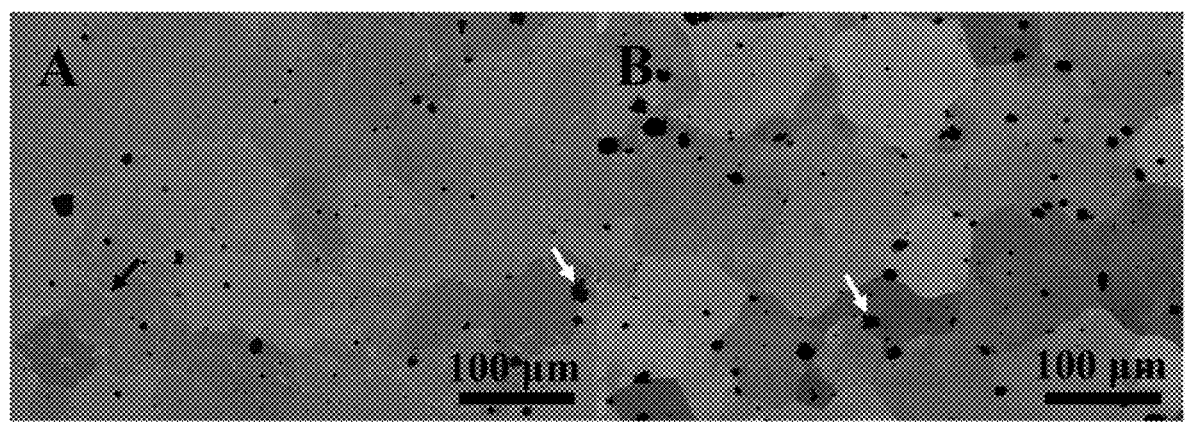
FIGS. 4A-4B.

FIGS. 4A and 4B show SEM images of the microstructure of sintered and heat-treated Fe-6Si specimens, respectively. The SEM in FIG. 4A is after sintering only and the SEM in FIG. 4B is after sintering followed by annealing. The material had some needle-like structures in the grains of the microstructure after sintering, as pointed out by the black arrow in FIG. 4A, which are possibly Fe2Si, ferrite, or SiC. As shown in FIG. 4B, the needle-like structures were absent after annealing in $H_2$. There was some porosity present within grains and at grain boundaries as indicated by the circular, smaller black hue in both samples. Some of the more irregular black spots are most likely carbide phase, as pointed out by the white arrows.

Figures 5A, 5B, 5C, 5D:
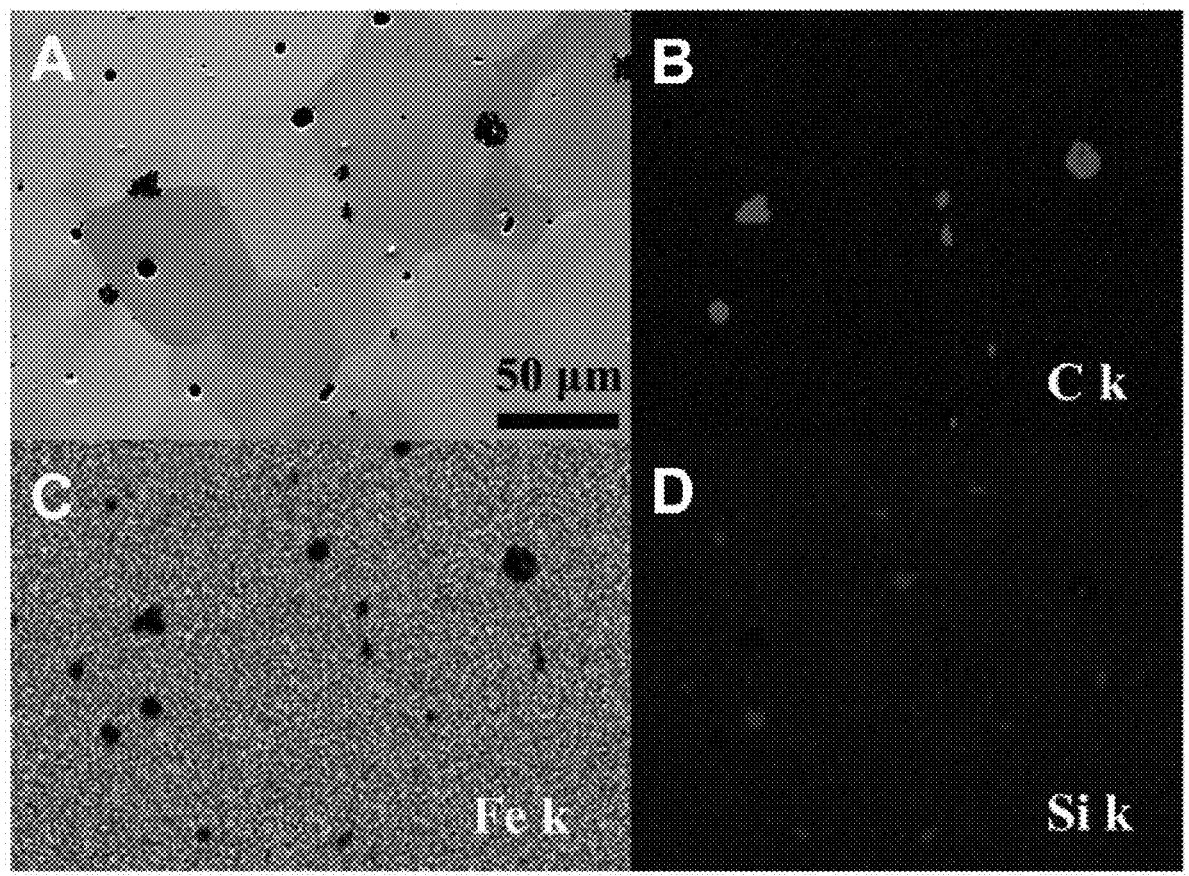
FIGS. 5A-5D.

FIG. 5A shows the SEM image of the $H_2$ annealed sample. FIGS. 5B-5D show the Energy-dispersive X-ray Spectroscopy (EDS) mapping images of C, Fe, and Si, respectively. The presence of C (i.e., carbon) was confirmed in FIG. 5B. The formation of carbide phase is most likely from carbon residue that is left behind from the polymer binder after pyrolysis or burnout.

Figures 6A, 6B, 6C, 6D:
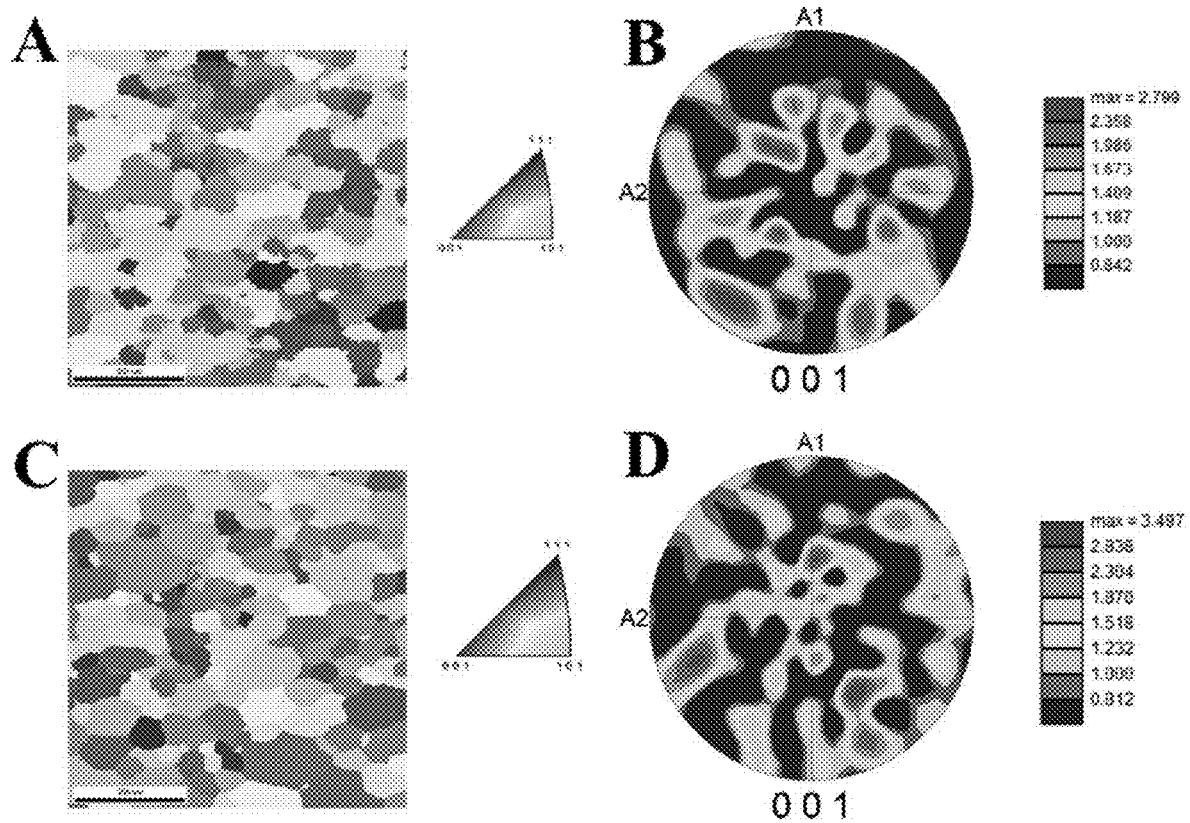
FIGS. 6A-6D.

FIGS. 6A-6D show EBSD data on Fe-6Si samples that were sintered and sintered-plus-annealed in an $H_2$ gas atmosphere at 800° C. for 30 minutes. Grain sizes and orientations were mapped with inverse pole figures (IPFs), as shown in FIGS. 6A and 6C. Grain sizes and orientations were also mapped with pole figure texture plots in FIGS. 6B and 6B. The average grain size was 56.3±32.8 µm for the sintered sample and 61.1±35.9 µm for the sample sintered and annealed in $H_2$ gas as reported in Table 1. The average grain size increased by roughly 10% during annealing. The IPF and texture plot both show a lack of specific texture components commonly associated with cubic materials. The maximum texture intensity is roughly 2.80 random in the sintered sample and roughly 3.5 random in the sintered plus annealed sample.

Figure 7:
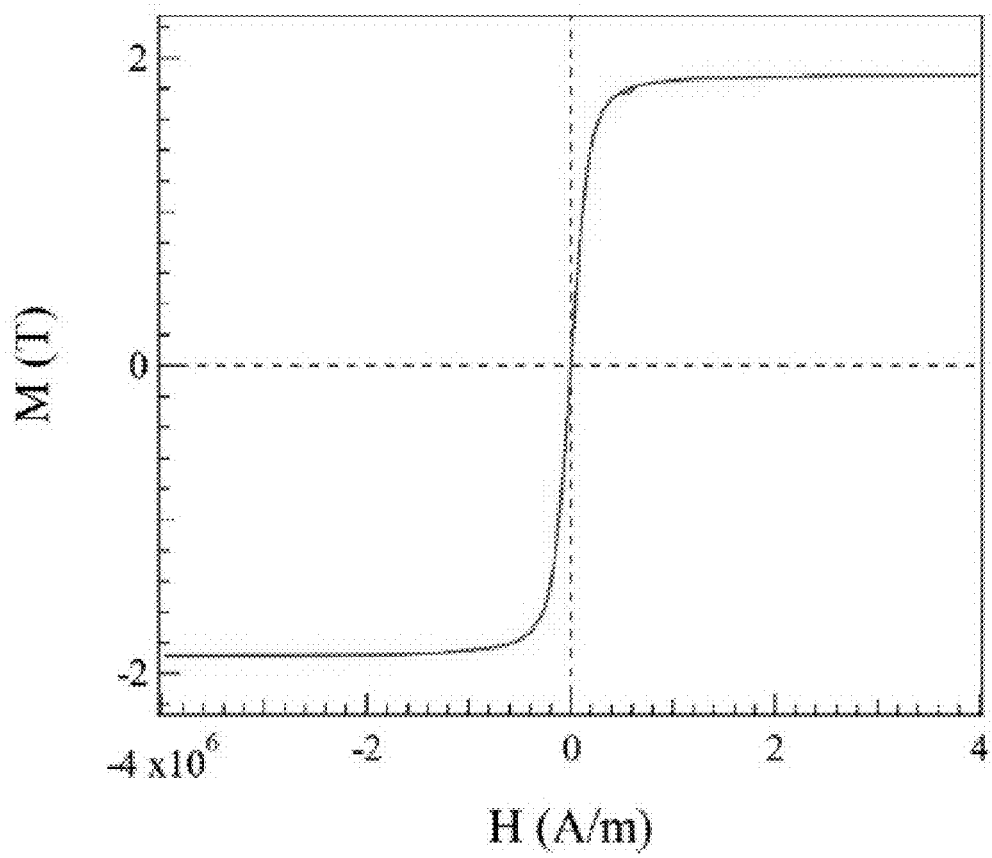
FIG. 7 shows a plot of a hysteresis loop of the sintered BJAM Fe-6Si alloy measured at room temperature.

FIG. 7 shows the saturation magnetization ($M_s$) value of the sintered Fe-6Si sample measured at 20 C using a SQUID magnetometer. The saturation induction is about 1.83 T, which is equivalent to the bulk sample produced by CVD (K. Okada et al., ISIJ Int. 36 (6), 706-713, 1996). The coercivity of the Fe-6Si sample is about 0.5 Oe, which indicates its highly soft magnetic characteristics.

Figure 8A:
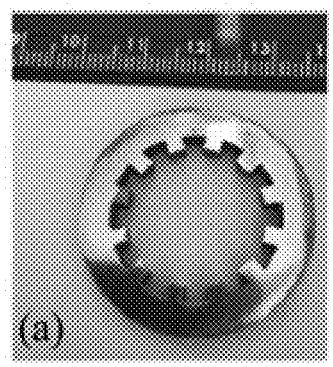
FIGS. 8A-8D.
Figure 8B:
Figure 8C:
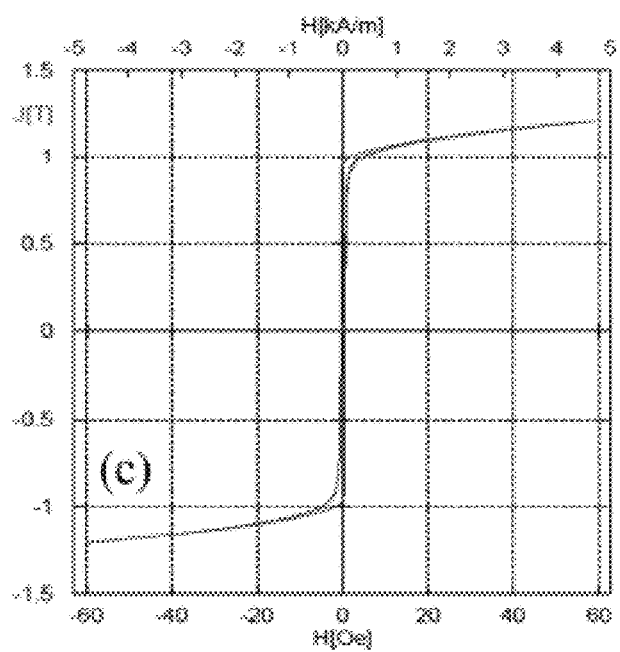
Figure 8D:
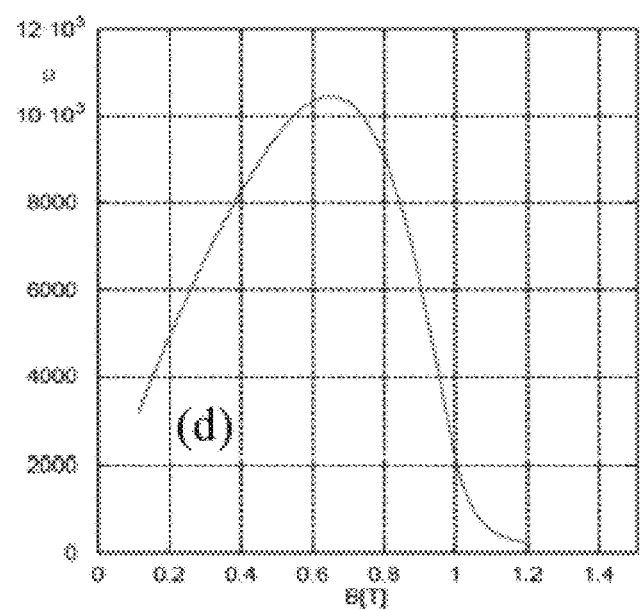

FIG. 8A is a photograph of a Fe-6Si ring specimen made using BJAM followed by sintering and annealing in $H_2$ at 800° C. The stator teeth sample was wound with a multi-strand Litz wire to measure the DC and AC magnetic property measurements, with photograph shown in FIG. 8B. The hysteresis loop was measured at a field of up to 60 Oe (FIG. 8C), and the corresponding maximum permeability is shown in FIG. 8D. The hysteresis curve shows square loop behavior with a low coercivity of 0.4 Oe and the maximum permeability of about 10,700. The permeability can be tuned further either by increasing the grain size or reducing the thickness of the stator ring. The printed stator rings can be sliced further into thinner parts, or thinner parts can be printed. The print thickness of 0.1016 mm, which is equivalent to the CVD-produced commercially available electrical steel, was not tested here.

Figure 9:
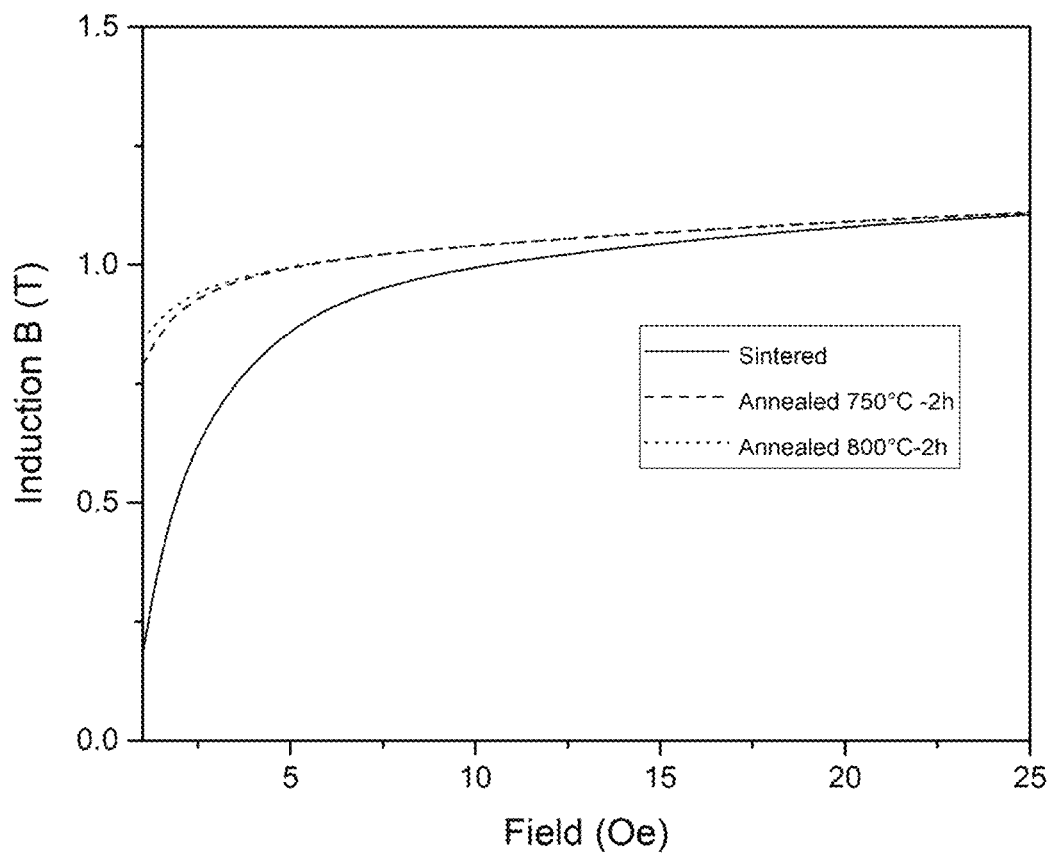
FIG. 9 is a plot of the initial magnetization curve of the as-sintered and annealed BJAM Fe-6Si sample.

FIG. 9 shows the initial magnetization curve of the as-sintered and $H_2$ annealed samples. After annealing, the remanence was increased at a very low applied field, which enhanced the squareness of the hysteresis loop, a required parameter for many power electronic applications.

Figure 10:
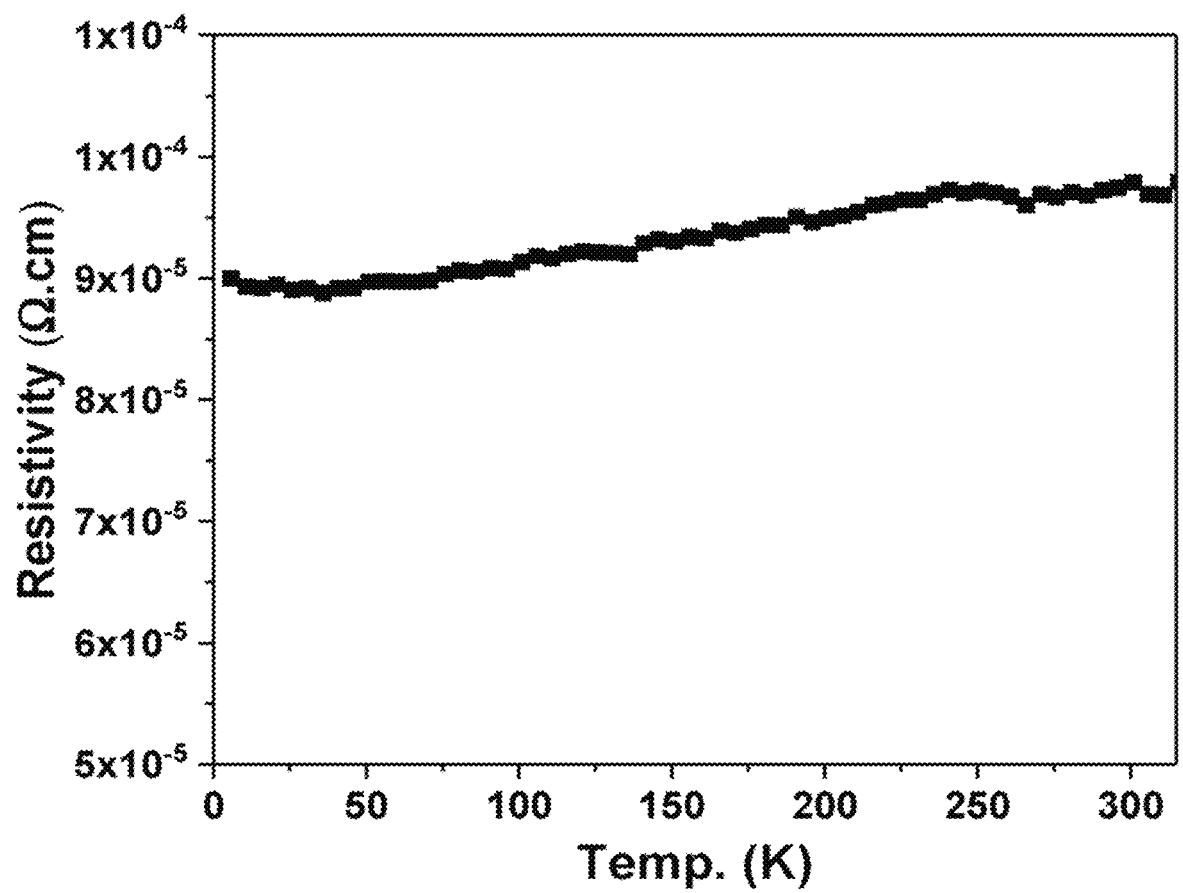
FIG. 10 is a plot of the electrical resistivity of the BJAM sintered Fe-6Si sample.

FIG. 10 shows the electrical resistivity of the $H_2$ annealed sample measured up to 300 K using a four-probe method. The electrical resistivity was about 98 µΩ cm, which is slightly higher than the value of the CVD produced 6.5% Si steel (82 µΩ. cm) (G. Ouyang et al., *J. Magn. Magn. Mater.*, 481, 234-250, July 2019). The presence of a small percentage of carbon and porosity (e.g., as shown in FIGS. 4A, 4B, 5A, and 5B) may have enhanced the electrical resistivity of the sample.

Table 2, below, shows data of the AC core loss measured at 60 Hz as a function of applied magnetic field for three different sample conditions: as sintered, annealed in $H_2$ at 750° C. for 2 hours, and annealed in $H_2$ at 800° C. for 2 hours. For each applied field, it is shown that annealing is progressively better for the core loss as each case has lower core loss.

TABLE 2

Fe—6Si AC core loss in Watts/kg. measured at a fixed frequency of 60 Hz at various applied fields. The dimensions of the stator ring: OD = 33.32 mm, ID = 21.77 mm and thickness = 1.02 mm". Density = 7.31 g/cm³.

| $B_m$ (T) | Corr loss of as-printed and sintered | Corr loss of sintered and further post-annealed in $H_2$ at 750° C., 2 h | Corr loss of sintered and further post-annealed in $H_2$ at 800° C., 2 h |
|---|---|---|---|
| 0.5 | 2.77 | 1.96 | 1.87 |
| 1 | 14.99 | 14.23 | 13.99 |
| 1.5 | 39.37 | 41.64 | 41.34 |

Table 3, below, shows AC core loss data as a function of frequency and applied field for three different sample conditions: as sintered, annealed in $H_2$ at 750° C. for 2 hours, and annealed in $H_2$ at 800° C. for 2 hours. At 10 kHz and 20 kHz, the core loss of the annealed samples was significantly reduced compared with the as-sintered sample. This may be due to the increase of density, reduction of porosity, reduction of impurity phases, and grain growth. There is either no improvement or a small improvement by increasing the annealing temperature by 50° C. Notably, the core loss depends on the thickness of the sample, and thus, it is possible to reduce the core loss further by making a thinner stator using the binder jet method.

TABLE 3

Fe—6Si core loss in watts/kg measured at different frequencies and applied fields (Tesla). The dimensions of the stator ring: OD = 33.32 mm, ID = 21.77 mm and thickness = 1.02 mm. Density = 7.31 g/cm³.

| Frequency (Hz) | B (T) | Sintered | Sintered and annealed in $H_2$ at 750° C., 2 h | Sintered and annealed in $H_2$ at 800° C., 2 h |
|---|---|---|---|---|
| 60 | 0.5 | 2.77 | 1.96 | 1.87 |
| 400 | 0.5 | 67.06 | 63.49 | 62.85 |
| 1000 | 0.5 | 362 | 371 | 372 |
| 10000 | 0.1 | 293.63 | 261 | 259.5 |
| 20000 | 0.05 | 177.51 | 146.03 | 144.4 |

Figure 11:
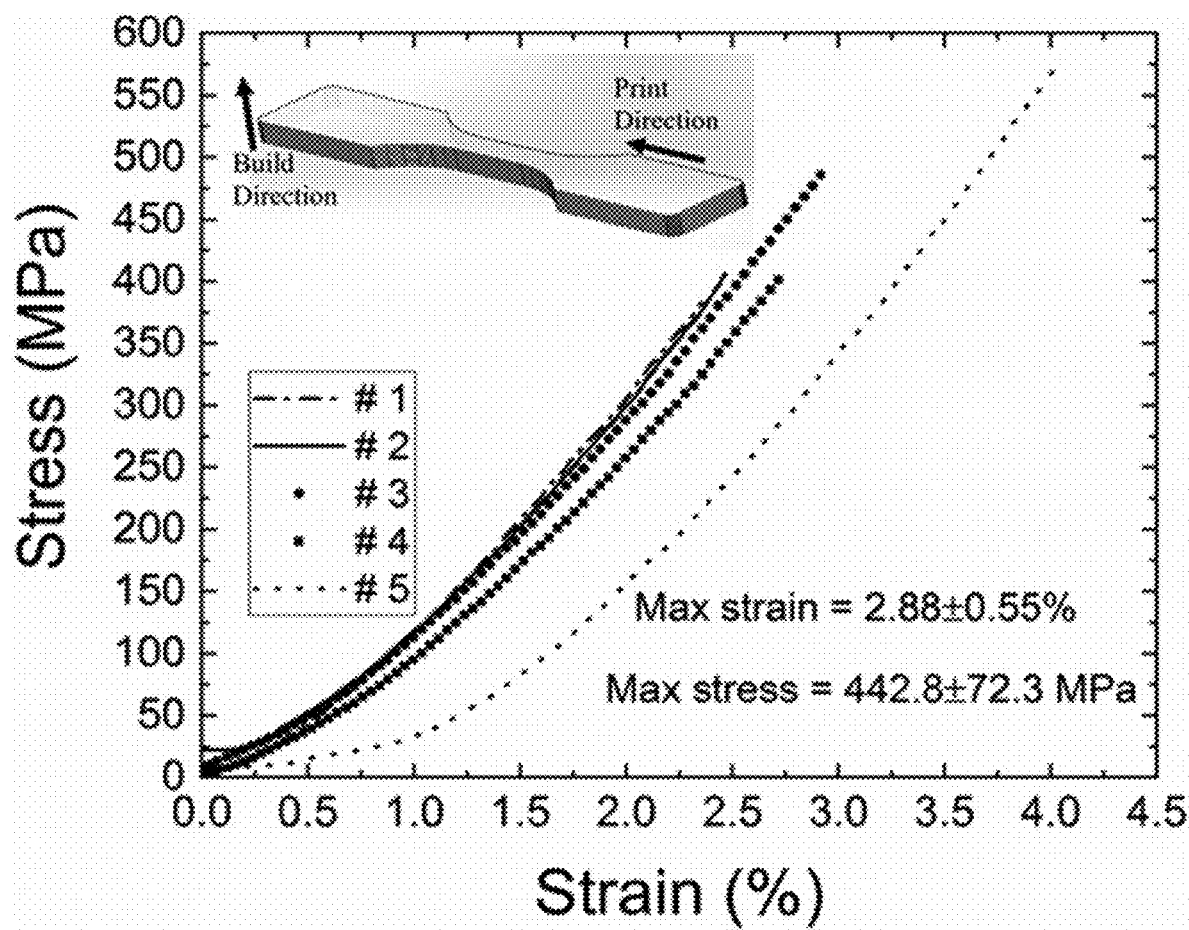
FIG. 11 is an RT tensile plot of 0.5 mm thick tensile specimens of sintered Fe-6Si samples.

FIG. 11 shows a plot of the data from mechanical testing of tensile specimens. The slip mechanisms proposed for B2 and D0₃ lattices adversely impact the mechanical properties, so it is important to test the mechanical properties and compare them to the present material. The maximum strain is 2.9±0.5% and the maximum stress is 434±68 MPa. This stress is most likely the ultimate tensile stress because there appears to be a lack of a linear region where a yield stress could be extracted. Compared to Fe—Si with similar Si content and annealing, the present data shows similar strength but lower strain. This is likely because the material is inherently more brittle or there are sizing effects with the geometry tested.

CONCLUSIONS

This study demonstrates a novel method to fabricate near net shape, fully dense soft magnetic Fe-6Si stators through binder jet additive manufacturing followed by solid state sintering to mitigate cracking. Nearly 99% dense parts with no cracks, an ultimate tensile strength of 434 MPa, and electrical resistivity of 98 μΩ cm, saturation magnetization of 1.83 T, a low coercivity of 0.4 Oe, a maximum relative permeability of 10.500 for 1.02 mm thick samples were achieved. The printed Fe-6Si parts have several advantages, such as reduction in core loss at low, medium, and high frequencies, high resistivity, and good magnetic permeability. The presently described method shows great promise for fabricating a range of 3D printed motors and other objects with improved efficiencies.

While there have been shown and described what are at present considered the preferred embodiments of the invention, those skilled in the art may make various changes and modifications which remain within the scope of the invention defined by the appended claims.

What is claimed is:

1. A bonded soft magnet object comprising bonded soft magnetic particles having a silicon-containing steel composition with a soft magnet characteristic, wherein said bonded soft magnetic particles have a particle size of at least 200 nm and up to 100 microns.

2. The bonded soft magnet object of claim 1, wherein the bonded soft magnetic particles have a particle size of at least 200 nm and up to 50 microns.

3. The bonded soft magnet object of claim 1, wherein the bonded soft magnetic particles have a particle size of at least 1 micron and up to 10 microns.

4. The bonded soft magnet object of claim 1, wherein the bonded soft magnetic particles have at least a bimodal size distribution.

5. The bonded soft magnet object of claim 1, wherein the silicon is present in an amount of 3-6.5 wt. % of the silicon-containing steel composition.

6. The bonded soft magnet object of claim 1, wherein the silicon is present in an amount of 4-6.5 wt. % of the silicon-containing steel composition.

7. The bonded soft magnet object of claim 1, wherein the silicon is present in an amount of 5-6.5 wt. % of the silicon-containing steel composition.

8. The bonded soft magnet object of claim 1, wherein the bonded soft magnetic particles are in admixture with electrically insulating particles.

9. The bonded soft magnet object of claim 8, wherein the electrically insulating particles have a composition selected from metal oxide and organic polymer compositions.

10. The bonded soft magnet object of claim 1, comprising at least one layer of the bonded soft magnetic particles bonded with at least one layer of electrically insulating particles.

11. The bonded soft magnet object of claim 1, comprising at least two layers of the bonded soft magnetic particles bonded with at least two layers of electrically insulating particles, wherein said layers of bonded soft magnetic particles alternate with said layers of magnetically insulating particles.

12. A method for producing a bonded soft magnet by indirect additive manufacturing, the method comprising:

(i) producing a preform constructed of a soft magnet material by an indirect additive manufacturing process in which particles of the soft magnet material become bonded together with an organic binder to construct the preform, wherein the particles of the soft magnet material have a silicon-containing steel composition with a soft magnet characteristic, and wherein said particles of the soft magnet material have a particle size of at least 200 nm and up to 100 microns;

(ii) subjecting said preform to an elevated temperature sufficient to remove said organic binder to produce a binder-free preform; and (iii) sintering said binder-free preform at a further elevated temperature to produce said bonded soft magnet.

13. The method of claim 12, further comprising annealing said bonded soft magnet to produce an annealed bonded soft magnet.

14. The method of claim 12, wherein the bonded soft magnet produced in step (iii) possesses a packing density of at least or above 90%.

15. The method of claim 12, wherein said indirect additive manufacturing process is a binder jetting process.

16. The method of claim 15, wherein said binder jetting process produces the preform in step (i) by separately feeding said particles of the soft magnet material and the organic binder into a binder jetting manufacturing device, and dispensing selectively positioned droplets of said organic binder from a printhead of said binder jetting manufacturing device into a bed of said particles of the soft magnet material to bind particles of the soft magnet material with said organic binder to form said preform.

17. The method of claim 12, wherein the particles of the soft magnet material have a particle size of at least 200 nm and up to 50 microns.

18. The method of claim 12, wherein the particles of the soft magnet material have a particle size of at least 1 micron and up to 10 microns.

19. The method of claim 12, wherein the particles of the soft magnet material have at least a bimodal size distribution.

20. The method of claim 12, wherein the silicon is present in an amount of 3-6.5 wt. % of the silicon-containing steel composition.

21. The method of claim 12, wherein the silicon is present in an amount of 4-6.5 wt. % of the silicon-containing steel composition.

22. The method of claim 12, wherein the silicon is present in an amount of 5-6.5 wt. % of the silicon-containing steel composition.

23. The method of claim 12, wherein the particles of the soft magnet material are in admixture with magnetically insulating particles.

24. The method of claim 23, wherein the magnetically insulating particles have a composition selected from metal oxide and organic polymer compositions.

* * * * *